Nov. 2, 1965  R. THOMASON  3,216,009
MEASUREMENT OR CONTROL OF THE ALTITUDE OF AIRCRAFT
Filed Sept. 4, 1962  4 Sheets-Sheet 4
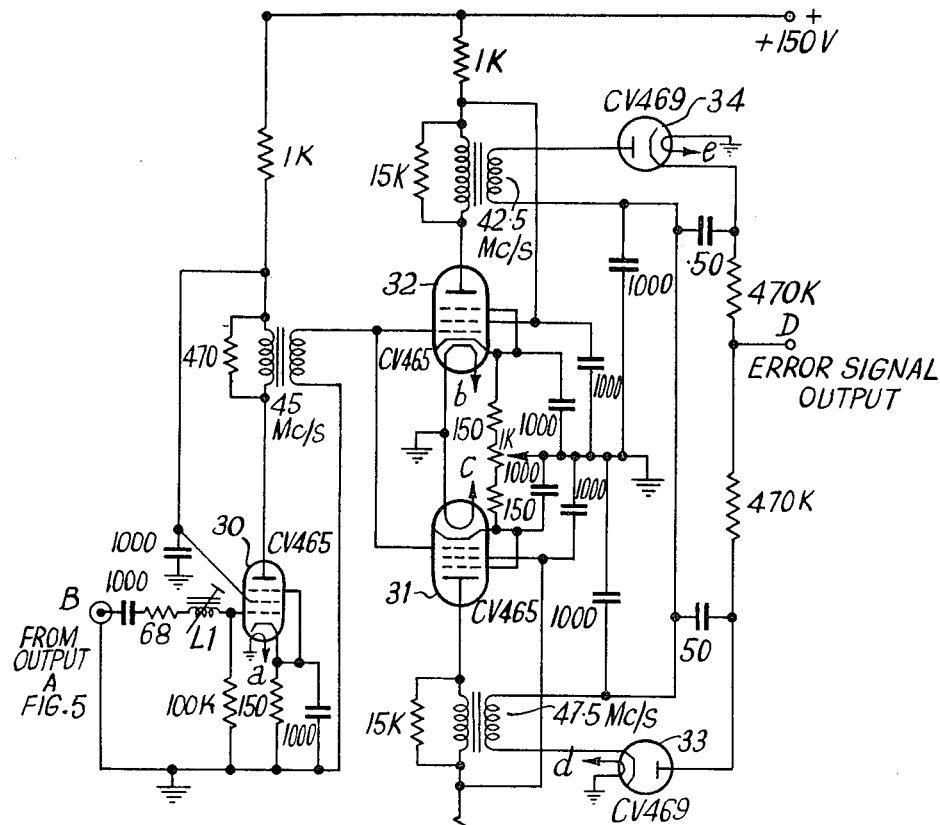
Fig. 6.
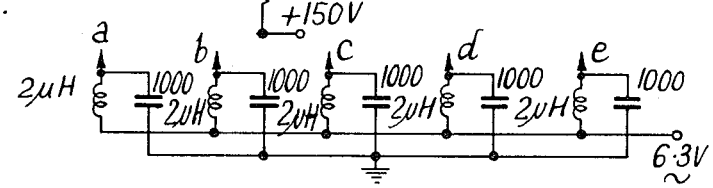
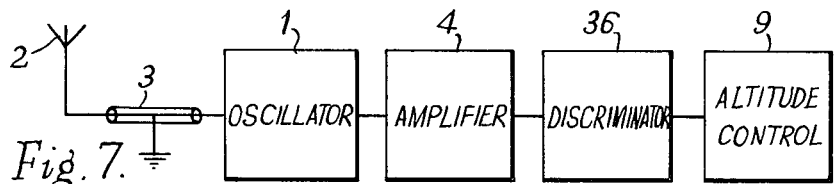
Fig. 7.
INVENTOR
Roy Thomason
BY Wenderoth,
Lind & Ponack
ATTORNEYS

United States Patent Office 3,216,009
Patented Nov. 2, 1965

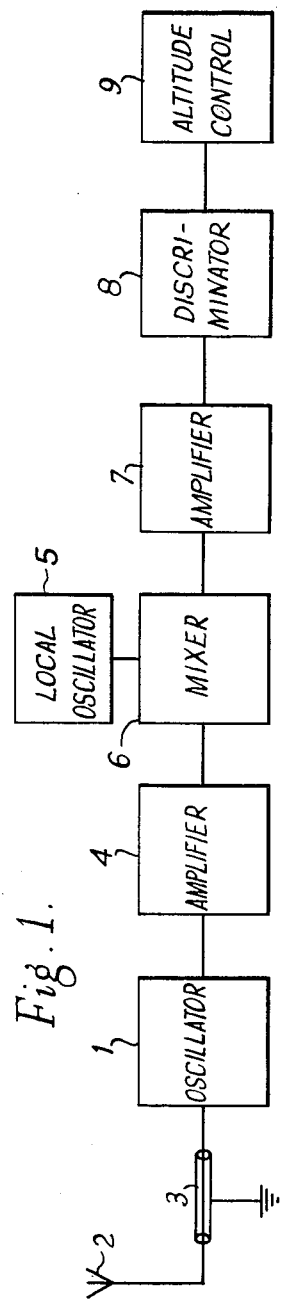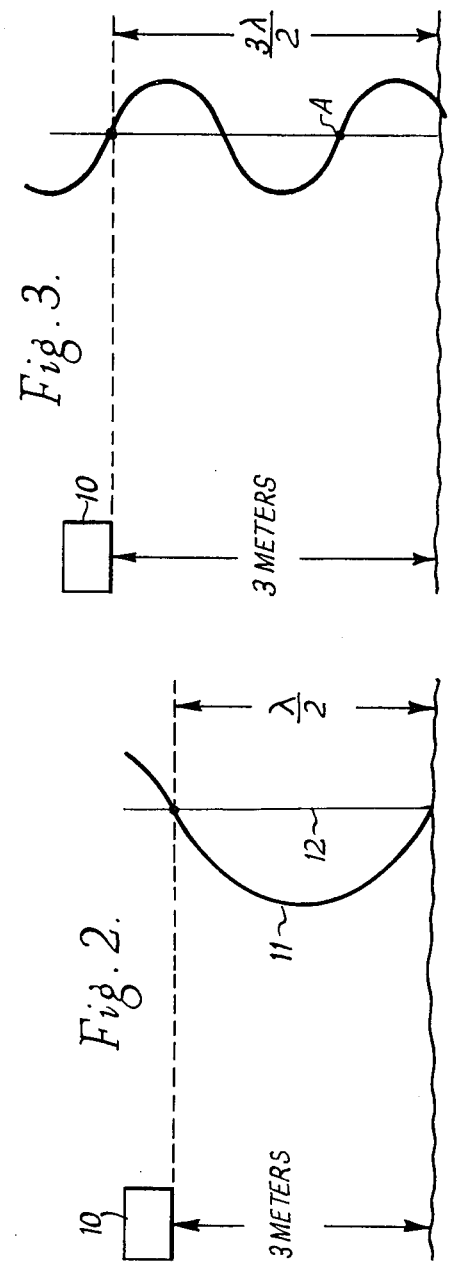

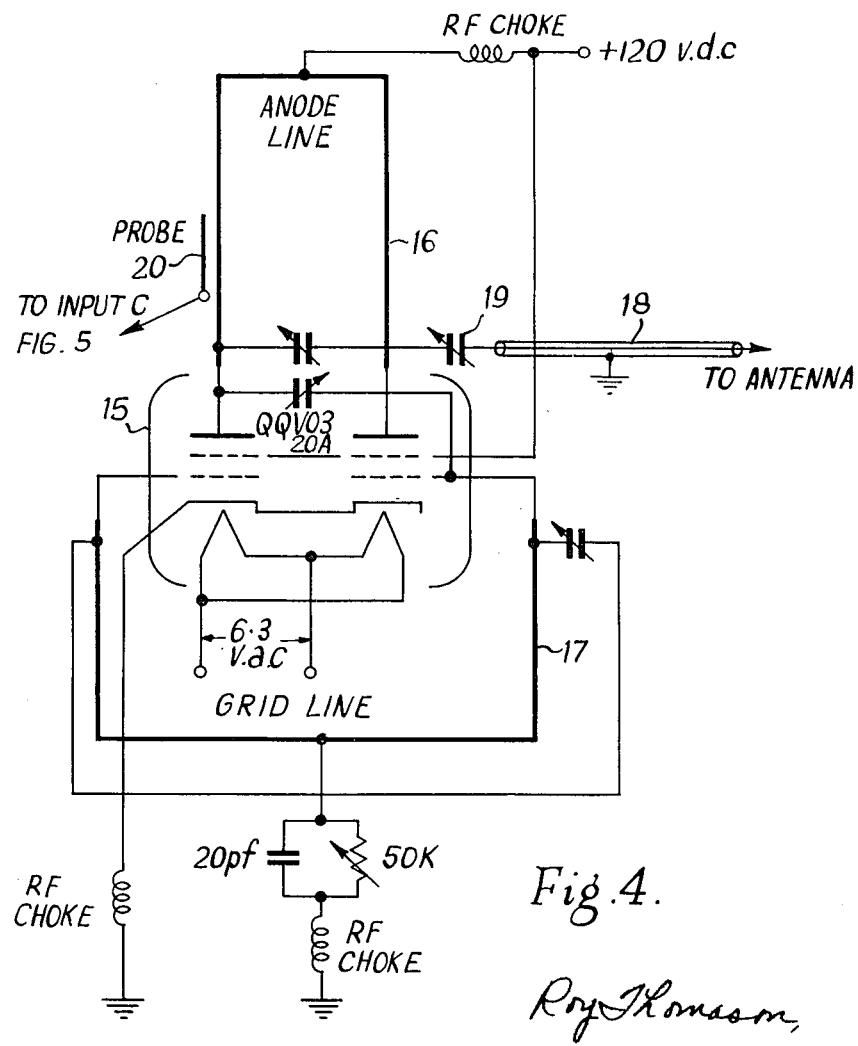

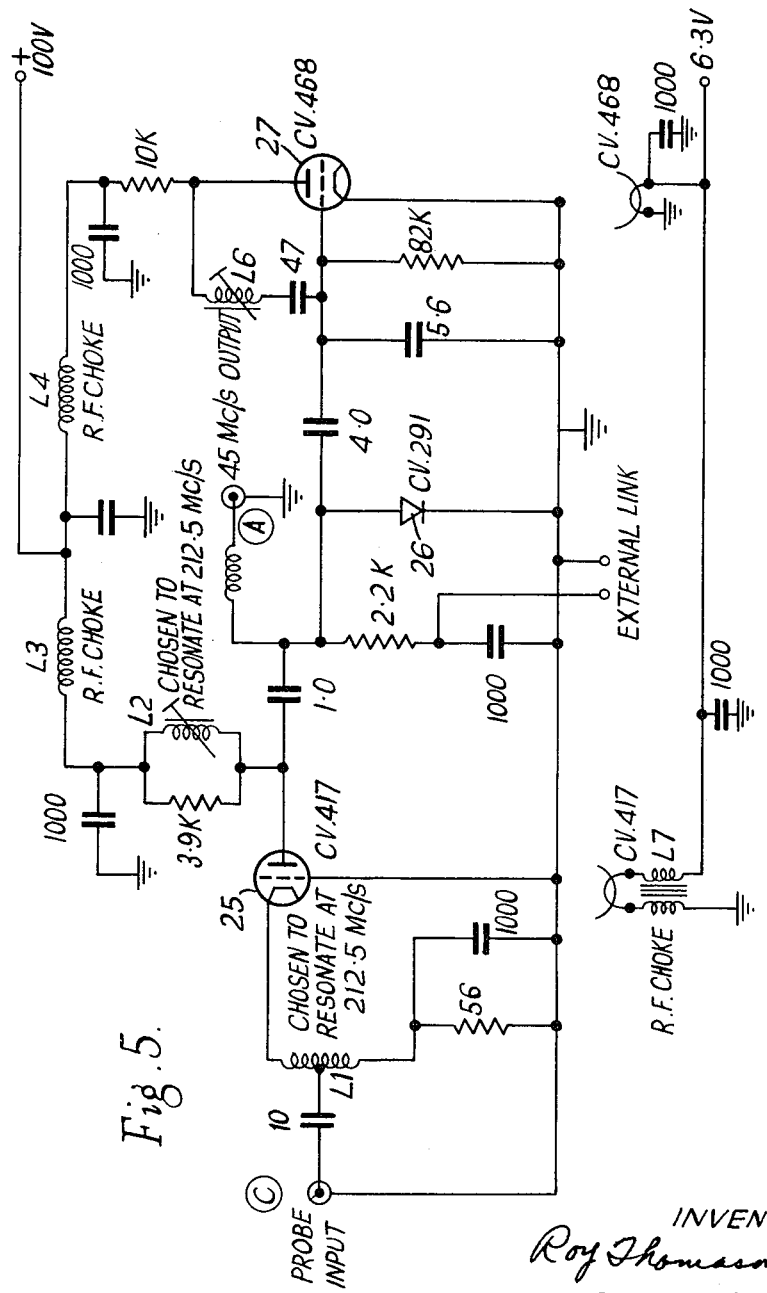

3,216,009
MEASUREMENT OR CONTROL OF THE ALTITUDE OF AIRCRAFT
Roy Thomason, Cranfield, England, assignor to Ripper Robots Limited, London, England
Filed Sept. 4, 1962, Ser. No. 221,087
Claims priority, application Great Britain, Sept. 5, 1961, 31,841/61
5 Claims. (Cl. 343—7)

This invention relates to a system for controlling the altitude of aircraft, more especially in the case where such altitude is comparatively small, e.g. of the order of a few metres only. The term "aircraft" as used herein is intended to include any type of craft or vehicle which can be maneuvered in the air and which can be flown at least at a low altitude above the ground.

Many systems are known for measuring the altitude of aircraft. Currently the most generally used system involves the measurement of time delay between radiated and reflected energy. Altimeters of this kind are accurate and reliable for normal applications, although relatively complex, but for use in low flying aircraft tend to be inefficient since they supply more information than may be required and have a relatively large requirement in space, weight and power consumption.

Systems of the kind in which the capacitance between the aircraft and the ground is measured have been proposed but they suffer from the disadvantage that the height measurement is not absolute and are difficult to adjust and control.

It is an object of the present invention to provide an improved system for measuring the altitude of aircraft which is particularly adapted for use in controlling the altitude at a relatively low value.

Another object of the invention is the provision of an improved system for maintaining an aircraft in flight at a constant and low predetermined altitude.

It is known that when the distance between an antenna and a reflecting surface is varied, the frequency of an oscillator supplying energy to the antenna will vary periodicaly about a mean value on account of the change in phase of the reflected energy reaching the antenna. This effect is due to the periodic change in impedance or admittance of the antenna caused by change in phase of the reflected energy and this in turn causes the oscillator frequency to shift by an amount which is dependent on magnitude of the change in admittance of the load on the oscillator represented by the antenna and the coupling between load and oscillator.

In such arrangement, the oscillator will exhibit a frequency deviation which will be zero when the distance between the reflecting surface and the antenna is $\lambda/2$ or a multiple thereof and which changes in a periodic manner between such positions. The maximum frequency deviation will decrease as the distance increases but this is not of importance since the device of the present invention is primarily designed for operation at comparatively low altitudes.

This phenomenon is utilised in the system of the present invention to control the altitude of an aircraft at a predetermined and relatively low value.

In the system of the present invention, an oscillator supplying energy to an antenna carried on the aircraft is adjusted to operate at a mean wavelength $\lambda$ selected such that the required altitude of the aircraft is $$n\frac{\lambda}{2}$$

where $n$ is a small whole number, and means are provided for generating error signals to control the altitude of the aircraft which are representative of deviation in wavelength of said oscillator from the selected mean value consequent on change in altitude of the aircraft.

According to an important feature of the invention, the oscillator is coupled with the antenna by means of a transmission line, or other device having similar characteristics, which is used as a phase shifting device which magnifies phase changes occurring at the antenna and produces bigger changes in wavelength of the oscillator output than would occur without its use.

Preferably the arrangement provides a D.C. error signal which varies in sign and magnitude in proportion to deviation in wavelength from the selected mean value.

In order that the system of this invention may be clearly understood some forms thereof will now be described with reference to the accompanying drawings, in which:

FIGURE 1 is a block diagram showing one form of the system,
FIGURES 2 and 3 are explanatory diagrams illustrating the application of the system of FIGURE 1,
FIGURE 4 is the circuit diagram of one form of the oscillator of FIGURE 1,
FIGURE 5 is the circuit diagram of one form of the amplifier, local oscillator and mixer of FIGURE 1,
FIGURE 6 is the circuit diagram of one form of the discriminator of FIGURE 1, and
FIGURE 7 is a block diagram of an alternative form of the system.

Referring now to FIGURE 1, there is shown one form of a system of altitude control according to this invention.

The system comprises an oscillator 1 supplying energy to an antenna 2 through a transmission line or feeder 3. A small part of the output from the oscillator 1 is extracted with light loading and, after amplification by amplifier 4 is applied, together with the output of a second and stable oscillator 5, to a mixer 6 and the difference frequency from such mixer is applied after amplification in amplifier 7 to a frequency discriminator 8.

This discriminator operates in known manner to provide a D.C. output the magnitude and sign of which is proportional to the variation in frequency from a mean value of the signal applied to the discriminator.

With the apparatus carried on an aircraft and with the antenna 2 arranged to direct energy towards the ground, the frequency of the oscillator 1 will vary periodically about a mean value as the altitude of the aircraft changes, the frequency deviation being zero when the altitude of the aircraft is a multiple of $\lambda/2$, $\lambda$ being the wavelength of the oscillations generated.

The mixer 6 and local oscillator 5 operate to convert the output of the oscillator 1 to signals of lower frequency which, however, will exhibit the same proportional deviation and the discriminator output is accordingly a function of the change in altitude of the aircraft about a mean value corresponding to a multiple of $\lambda/2$. By applying the discriminator output to operate appropriate altitude control means 9, the aircraft may accordingly be maintained at a constant altitude which can be selected by appropriate choice of the wavelength of the signals generated by the oscillator 1.

The operation of the system may be appreciated by reference to FIGURES 2 and 3 which illustrate alternative conditions under which an aircraft 10 may be controlled to fly at a constant altitude of 3 meters. As shown in FIGURE 2, the wavelength of the oscillator 1 may be selected such that $$\frac{\lambda}{2}=3 \text{ meters}$$

and in such case the deviation of curve 11 about its vertical axis 12 represents the change in wavelength of the oscillator which occurs if the altitude of the aircraft changes from 3 meters. The deviation of curve 11 also represents the magnitude and sign of the error signals obtained from the discriminator 8 and it will be appreciated that so long as the variation of altitude does not exceed $$\pm\frac{\lambda}{4}$$

the error signals can be effective to cause controlling forces to be applied to maintain the altitude constant at 3 meters.

However, if the system is so designed that the automatic control stabilizes the altitude of the aircraft at heights equal to an odd multiple of $\lambda/2$, it will not, without modification, stabilize the altitude at even multiples of $\lambda/2$ since in such positions the D.C. error signal will vary in opposite sense.

For the desired operating height of three meters therefore, if the normal frequency of the oscillator is arranged to be $$50 \text{ megacycles} \left(=\frac{\lambda}{2}\right)$$

as shown in FIGURE 2, the next higher altitude at which the aircraft can be stabilized will be nine meters, and there will be no stable position below the desired altitude of three meters. In some circumstances, therefore, it is preferred to use a higher operating frequency for the oscillator, for example $$150 \text{ megacycles} \left(=\frac{3}{2}\lambda\right)$$

which will produce the deviation curve 13 of FIGURE 3. As shown, such curve will provide a stabilized altitude at the desired three meters and also at points such as A which occur at intervals of 2 meters above and below this altitude. Accordingly, if for any reason the altitude of the aircraft changes beyond the range of control, it will be stabilized at a new altitude, e.g., at the point A. Obviously the controlled altitude need not be at three meters and any desired operating altitude may be selected by appropriate control of the frequency of the oscillator 1 of FIGURE 1.

It will be appreciated that the accuracy of the system will be affected by drift of the frequency of the oscillators 1 and 5. In practice, however, such drift may be kept much smaller than the deviation produced by changes in altitude, especially if the oscillators use solid state devices, thereby avoiding thermal drifts occasioned by the use of thermionic devices having heated cathodes.

FIGURE 4 shows the circuit diagram of an oscillator which may be used as the oscillator 1 of FIGURE 1. As shown in FIGURE 4, the oscillator comprises a twin tetrode tube 15 arranged for push-pull operation with tuned anode and tuned grid Lecher lines 16 and 17. The normal frequency of oscillation of the oscillator was selected to be 212.5 mc./s. and the circuit was designed in a manner appropriate to operation at such frequencies. The feeder 18 is coupled to one side of the anode line 16 by means of a variable capacitor 19 at a point near the tube anode pin where the voltage is near maximum. The output to the amplifier 4 (FIGURE 1) is taken from a probe 20 mounted adjacent the other side of the anode line 16 to provide a fixed loose coupling. In other respects, the arrangement is conventional and need not be further described.

The antenna itself may be of any suitable kind that can be arranged on an aircraft so as to direct radiated energy towards the ground and since such antennae are well known need not be described herein.

Owing to energy reflected back from the ground, the antenna will exhibit periodic changes in input admittance as its altitude changes. The antenna is coupled to the oscillator through a transmission line and it is important that it is mismatched to this line at the operating frequency.

The dependence of oscillator frequency upon load and coupling is explained in many standard texts. The relationship can be shown graphically in the form of a Rieke diagram for any particular oscillator and load combination. In such a diagram contours of constant frequency and power output appear as functions of load for all possible combinations of complex load admittance. Moreover the oscillator pulling curve may be derived from this diagram.

Two main considerations dictate the choice of feeder length. The antenna in free space will have some definite value of input admittance depending on the geometry of the antenna, the driving frequency, and the characteristic admittance of the feeder transmission line. There will in general be a standing wave pattern on the line. Admittance then varies periodically along the line depending upon the point at which measurement is made, but repeating its values at half wavelength intervals. Thus the feeder must be cut to some integral number of half wavelengths plus that fraction of a half wavelength determined by the difference between the antenna free space admittance at operating frequency and the admittance required at the oscillator terminals to produce that operating frequency according to the Rieke diagram. The integral number of half wavelengths of feeder used are chosen based on a different consideration. There is a mutually repetitive relation between electrical feeder length and frequency in this system, since any perturbation in frequency will cause a change of electrical feeder length resulting in a different admittance at the oscillator, hence a further change in frequency. Whether this is stable or not depends on the rate of change of oscillator frequency with electrical phase of the load presented to its terminals as compared with the reciprocal rate of change of electrical phase on the line with frequency. Since electrical phase on a transmission line is given by:

$$\phi=\frac{2\pi f l}{c_{\text{cable}}}$$

where $f$ is the operating frequency, $l$ is the length of the line, and $c$ is the velocity of propogation in the cable, the rate of change of phase with frequency is $$\frac{d\phi}{df}\bigg]_{\text{line}}=\frac{2\pi l}{c_{\text{cable}}}$$

This is directly dependent on the physical length of cable. For maximum pulling effect without splitting, it is desirable to choose an integral number of half wavelengths to give a slope, $$\frac{df}{d\phi}\bigg]_{\text{line}}$$

just greater than that of the oscillator pulling curve at the operating frequency. The result of coupling the antenna, which is a height-to-admittance transducer, to the oscillator, which is an admittance-to-frequency transducer, through the properly selected feeder, which is an admittance change multiplier, will therefore be a frequency shift directly related to changes in altitude of the antenna.

FIGURE 5 shows a circuit diagram of the amplifier 4, local oscillator 5 and mixer 6 of FIGURE 1. The amplifier comprises tube 25 arranged in a grounded grid circuit which receives input from the coupling probe 20 (FIGURE 4) and is provided with grid and anode circuits resonating at the normal oscillator frequency of 212.5 mc./s.

The output of the amplifier is applied to a mixer comprising diode 26 to which is also applied the output of a local oscillator comprising tube 27 which operates at a frequency of 167.5 mc./s., the mixer output available at terminal A being thus at 45 mc./s.

FIGURE 6 shows the circuit diagram of the amplifier 7 and discriminator 8 of FIGURE 1. The amplifier comprises tube 30 having grid and anode circuits resonating at the operating frequency of 45 mc./s. The discriminator comprises tubes 31 and 32 which receive input in parallel from the amplifier and which have anode circuits tuned to 45 mc./s.±2.5 mc./s., respectively, and coupled to rectifiers 33 and 34. The output of the two rectifiers is applied to terminal D at which is available a D.C. error signal which varies in magnitude and sign as the altitude of the aircraft and accordingly the frequency of the oscillator 1 (FIGURE 1) changes. The operation of the discriminator is quite conventional and therefore need not be further described.

An alternative form of the system is shown in FIG-URE 7. In this case part of the oscillator output is amplified by an amplifier 4 as previously but the amplifier output is applied directly to a discriminator 36 which accordingly operates at the frequency of the oscillator 1 instead of at a lower frequency as in the system of FIGURE 1. In other respects the operation of the system of FIGURE 7 is the same as that of FIGURE 1.

In both the system of FIGURE 1 and FIGURE 7 the D.C. error signal that is provided is applied to adjust in appropriate manner the altitude of the aircraft. The nature of this kinematic control will depend on the type of aircraft used but since the application of error signals to effect kinematic control of an aircraft is now well known and understood it is not necessary to describe this part of the system.

It will be appreciated that the system of this invention enables an aircraft to be flown at a constant altitude which may be selected very simply by control of the frequency of the energy radiated from the antenna. Moreover, the system provides that there may be a range of altitudes at any one of which the aircraft may be stabilised by the control system.

I claim:

1. A system for maintaining an aircraft at a constant low altitude comprising an oscillator adjusted normally to generate oscillations having a wavelength $\lambda$ so selected that the said constant altitude is equal to a low order multiple of $\lambda/2$, an antenna for radiating the oscillations, towards the ground, means responsive to change the wavelength of the oscillations consequent to a departure of the aircraft from the desired altitude for generating error signals including a transmission line connecting said oscillator and said antenna, said line being mismatched to said antenna at the normal operating wavelength, and means for applying said error signals to restore the aircraft to the desired altitude.

2. A system as claimed in claim 1 including frequency discriminating means for providing D.C. error signals when the frequency of the said oscillations varies from the value corresponding to the said selected wavelength.

3. A system as claimed in claim 1, wherein the electrical length of the transmission line is selected such that it comprises an integral number of half wavelengths giving a reciprocal rate of change of phase on the line with frequency which is just greater than the rate of change of oscillator frequency with phase of its load.

4. A system as claimed in claim 1, wherein the transmission line includes a section having adjustable constants.

5. A system as claimed in claim 1, further comprising means for reducing the frequency of the signals applied to said discriminator, said means including a local oscillator and a mixer receiving input from said oscillator and said local oscillator.

References Cited by the Examiner
UNITED STATES PATENTS

| | | | |
|---|---|---|---|
| 1,756,462 | 4/30 | Jenkins | 343—112.2 |
| 1,969,537 | 8/34 | Alexanderson | 343—12 |
| 2,042,490 | 6/36 | Zahl | 343—112.2 |
| 2,499,349 | 3/50 | Ayres | 343—112.2 |
| 2,568,568 | 9/51 | Stansbury | 343—112.2 |
| 2,705,319 | 3/55 | Dauber | 343—7 |
| 2,911,639 | 11/59 | Hopkins et al. | 343—7 |
| 2,965,894 | 12/60 | Sweeney | 343—7 |
| 3,191,171 | 6/65 | Zuefeldt et al. | 343—7 |

CHESTER L. JUSTUS, *Primary Examiner.*